Figure 1:
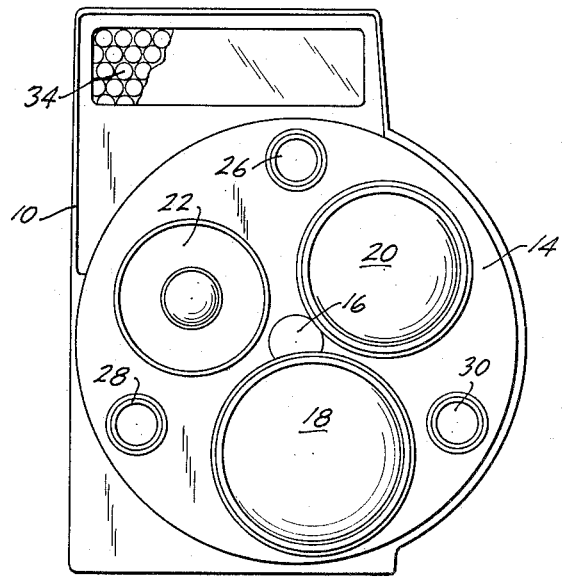

Nov. 29, 1960   M. RENGER ET AL   2,961,936
CAMERA

Filed Dec. 1, 1959   2 Sheets-Sheet 1

INVENTORS
THOMAS W. HEERMANS
MARTIN RENGER
BY
ATTORNEY

Nov. 29, 1960   M. RENGER ET AL   2,961,936
CAMERA
Filed Dec. 1, 1959   2 Sheets-Sheet 2

INVENTORS
THOMAS W. HEERMANS
MARTIN RENGER
BY
ATTORNEY

United States Patent Office 2,961,936
Patented Nov. 29, 1960

2,961,936
CAMERA

Martin Renger, Saline, and Thomas W. Heermans, Ypsilanti, Mich., assignors to Sylvania Electric Products Inc., a corporation of Delaware Filed Dec. 1, 1959, Ser. No. 856,504

6 Claims. (Cl. 95—64)

The present invention relates to photographic cameras and more particularly to cameras in which the exposure is automatically determined by the effect of incident light falling on a photo-electric cell forming part of the camera mechanism.

An object of the present invention is to provide the user of such a camera with a continuously visible indication of the amount of light received by the film in the camera.

Another object of the present invention is to provide a convenient indication of insufficient or excessive light conditions for proper exposure.

Still another object of the present invention is to provide for direct optical observation of the operation of an automatic photo-electrically controlled diaphragm of a photographic camera.

Still another object of the present invention is to improve the facility of operation of automatic photoelectrically controlled diaphragm types of photographic cameras.

Still a further object of the present invention is to provide in a camera, as aforesaid, a positive indication, visible in the viewfinder window, as to whether the camera is set for its automatic mode of operation of whether it is set for manual adjustment of the diaphragm.

Still a further object of the present invention is the provision, in an automatically controlled motion picture camera having a multi-lens turret, of an arrangement for using the otherwise unused lenses of the turret as a source of illumination for an optical indicating system, which indicates directly in the viewfinder the aperture at which the active objective is being operated.

The foregoing objects and others which may appear from the following detailed description, are attained in accordance with principles of the present invention, by the provision, in a photographic camera having a photo-electric cell, either photo-voltaic or photo-conductive, and a galvanometer motor coupled thereto, and to the diaphragm of the camera, of an optical train running from the viewfinder through a transparent index plate bearing indicia representative of various settings of the diaphragm to a location just to the rear of one of the unused lenses of the multi-lens turret whereby the light for imaging the screen indicia is obtained from the front of the camera through such unused lens. As the galvanometer motor rotates in accordance with the current generated by the photoelectric cell, the translucent screen swings so that one or the other of the indicia representative of the settings of the diaphragm intercepts said light beam from the unused lens to an imaging system in the viewfinder. Thus the actual aperture being used by the camera at any instant is at all times known to the operator.

We prefer to apply distinctive colors or other indicia to the end areas of the movable screen so that the operator is instantly warned by the appearance of distinctive images in the field of view of the viewfinder, or in a special adjacent field of view but still within the finder, that the available light is either too great or too small for proper picture taking.

Since imaging the diaphragm indicia in the viewfinder when the camera is set for its manual mode of operation might be confusing, we provide means for occulting the automatic diaphragm readings during such times. Otherwise the operator may have set the manual diaphragm at f. 6 for example, while the automatic diaphragm, being disconnected in the manual position, would be indicating that the automatic diaphragm was at its maximum position.

Figure 2:
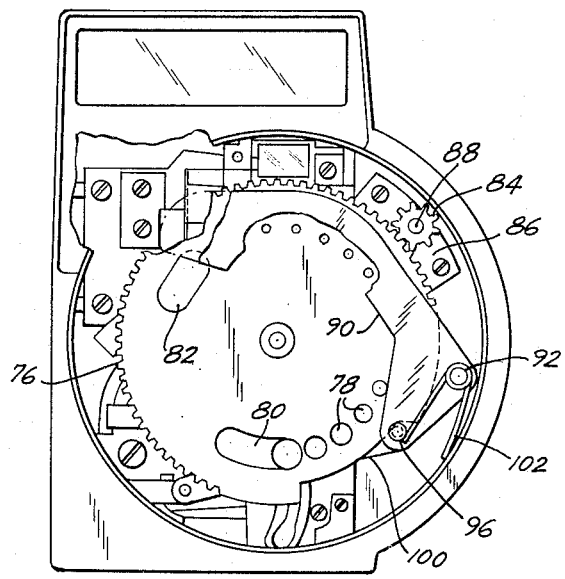
Figure 3:
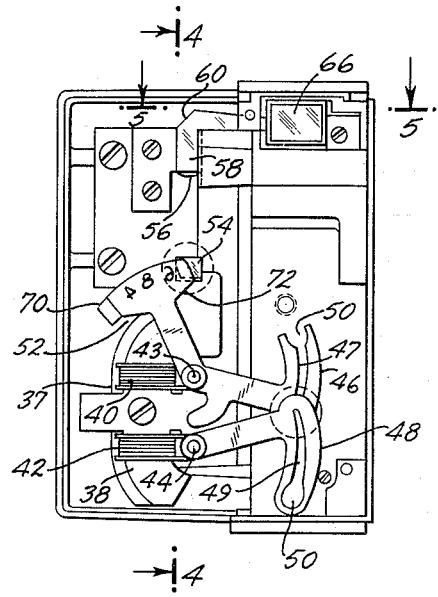
Figure 4:
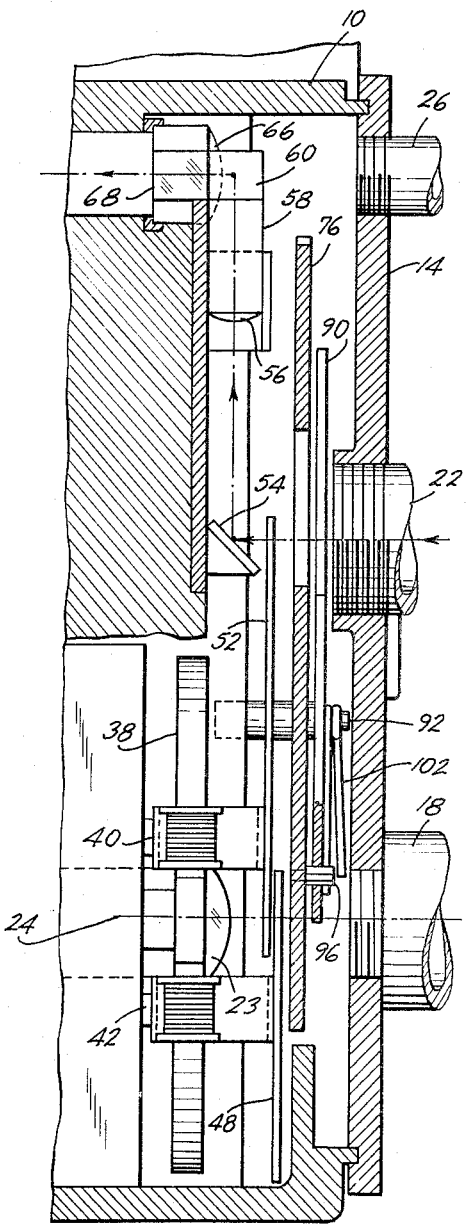
Figure 5:
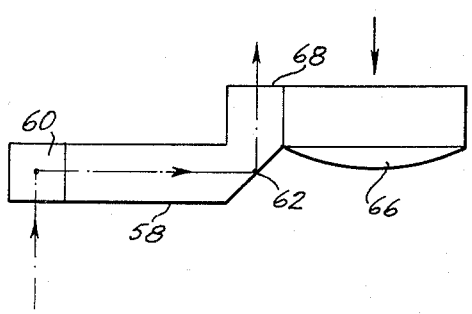

The present invention will become more fully understood by reference to the following detailed description, which is accompanied by a drawing in which:

Figure 1 illustrates an end view of a camera embodying principles of the present invention; and Figure 2 is an end view similar to Figure 1 but with the lens turret removed and certain parts broken away in order to show the interior construction behind the lens turret; and Figure 3 is an enlarged view somewhat similar to Figure 2 but with the topmost layer of parts removed in order to show more clearly the operation of elements behind the parts in Figure 2; and Figure 4 is a vertical cross-section of the camera taken in a direction indicated by line 4—4 of Figure 3; and Figure 5 is a fragmentary, but enlarged view, of a small portion of the structure shown in Figure 3, taken along line 5—5 particularly to illustrate the optical path employed.

In Figure 1 there is shown in front elevation, a movie camera containing an embodiment of the present invention. The camera includes a generally rectangular box-like casing having a front plate 10 provided with a circular front opening over which is mounted a rotatable lens turret 14. Turret 14 is arranged to be rotated about pivot 16 to bring any one of a number of different lenses 18, 20, and 22 into operative relationship with rear lens 23 (Figure 4) along the optical axis 24 of the film exposure gate within the camera. The body of the camera also includes space for a roll or cartridge of movie film, a film gate through which the film passes when it is exposed, a shutter mechanism and a spring motor or other means for driving the shutter and advancing the film. None of these latter parts are shown in the drawings since they do not directly enter into the operation of our invention and are well understood in the art.

Turret 14 is also provided with a number of viewfinder lenses 26, 28 and 30. Each viewfinder lens is matched to one of the taking objectives so that when, for example, lens 18 is in position in front of the film gate, viewfinder lens 26 provides in the viewfinder an indication of the field of view exposed to the film by lens 18. Facing forwardly of the camera, and generally responsive to the same light as imaged through any one of the objective lenses 18 to 22, is a photoelectric cell 34. Cell 34 generates an electric current generally proportional to the amount of light falling on its front surface. In Figure 2, the lens turret has been removed and part of the front face broken away to disclose the structure therebehind which our invention is directly concerned. Also in Figure 3 some of the parts shown in Figure 2 have been removed in order to show structure more clearly behind the parts which have been removed. The automatic diaphragm control means includes an electric motor 37 of the D'Arsonval galvanometer type having a permanent magnet 38 producing a magnetic field in which wire windings 40 and 42 are at least partly immersed so that a current flow through the windings urges them to move about pivots 43 and 44 respectively. The current causes winding 40 to move in a counterclockwise direction about pivot 43 and winding 42 in a clockwise direction around pivot 44. The current for moving the coils is supplied by wiring connections, not shown, from photoelectric cell 34 (Figure 1). Hair springs (not shown) are connected to coils 40 and 42 urging winding 40 to rotate in clockwise direction and winding 42 in a counterclockwise direction, toward the extreme limit of rotation opposite to that shown in Figure 3. A pair of diaphragm blades 48 are secured to coils 40, 42 respectively, in such a manner that as coils 40 and 42 rotate about pivots 43, 44, diaphragm blades 46 and 48 are caused to swing in closely adjacent parallel planes, normal to the axis of pivots 43, 44 and also normal to the optical axis 24. Diaphragm blades 46 and 48 are each provided with tapered arcuate slots 47 and 49 respectively and centered radially through optical axis 24. Each slot terminates at its wider end in an enlarged aperture 50 so that when there is no current flowing through coils 40 and 42 and they tend to swing as far away from each other as possible the apertures 50 form an approximately circular aperture at least as large as the maximum F stop or aperture of the lens system centered about axis 24. Current flowing from the photoelectric cell 34 causes blades 46, 48 to move toward each other against the urging of the hair springs and arcuate slots 47 and 48 form a generally rectangular aperture centered about axis 24 and having an area inversely proportional to the amount of light flowing on cell 34. Thus, within limits, at a given shutter speed and for a given film speed, a proper exposure can be given to the film no matter how the light falling on the scene being photographed changes. However, it is desirable to give the operator of the camera a continuous visible reading of the actual aperture being used. This is accomplished by providing a translucent index plate 52 attached to coil 40 and arranged to swing therewith about the axis of pivot 43. Thus as coil 40 swings under the influence of current generated by photoelectric cell 34, one of the indicia carried by the translucent end of index 52 is caused to be centered over mirror 54, mounted directly in line with optical axis of one of the unused lenses of the turret. Thus, if we assume, for example, that lens 18 is in the picture taking position concentric with optical axis 24, lens 22 will be stationed over mirror 54. Light from the scene being photographed falls in an unfocused condition on the portions of index 52, directly behind lens 22. The image of the particular indicia centered behind lens 22 is picked up by mirror 54 and directed upwardly along an optical path passing through lens 56 and into multi-faceted prism 58. The light beam is totally internally reflected from face 60 of the prism 58 and directed to the right in Figures 3 and 5 until it reaches totally reflecting face 62 of prism 58 where it is directed rearwardly at the edge of the viewfinder window 66. The focal length of lens 56 is so adjusted that in the viewfinder an erect image of individual ones of the indicia on the index 52 are imaged on 68. Thus, the eye of an observer, at the ocular end of the viewfinder, will see the selected indicia at the edge of the scene being taken, as viewed in the rangefinder window 66. End portions 70 and 72 of the index 52 are preferably distinctively colored relative to the central portion, for example, red while the central portion may be white or green. Thus, the field at the edge of viewfinder window 66 may show white or green when the film exposure is proper, as well as the relative aperture number whereas a red field may indicate gross over-exposure or under-exposure. Since it may be desirable in some circumstances to manually set the effective lens aperture to some value not determined by the photoelectric cell and motor mechanism, I have provided an additional manual diaphragm comprising an opaque disc 76 (Figure 2 and Figure 4) having a series of Waterhouse stop apertures 78, arranged about the diameter of a circle centered at pivot 16 and having a radius equal to the distance between optical axis 24 and pivot 16. Aperture 80, at the same radial distance from the pivot 16 is larger than any attainable by diaphragm leaves 46, 48, and is placed in position concentric with the optical axis 24 when automatic operation is desired. A second enlarged aperture 82 is provided in disc 76 immediately in front of mirror 54 when aperture 80 is in position over the optical axis 24. When manual selection of the diaphragm aperture is desired, a preselected smaller aperture 78 is substituted for aperture 80 by rotating disc 76 by means of pinion gear 84 meshing with gear teeth 86 on the edge of diaphragm disc 76. Shaft 88 for pinion 84 extends to a convenient location at the rear of the camera for manual operation of the pinion and consequent rotation of the diaphragm disc 76. A switch (not shown) coupled to diaphragm disc 76 short circuits electric motor 37 in all positions of disc 76, except when aperture 80 is in position at the optical axis 24. Otherwise it would not be possible to manually select a diaphragm stop larger than that determined by the automatic mechanism.

In order to assure that the operator of the camera is not confused by viewing warning portion 72 of index 52 at the edge of the viewfinder window, when one of the manually selected diaphragm apertures 78 is in use, we have provided an opaque shutter 90, journalled on pivot 92 and arranged so that when follower roller 96 rides on the peripheral edge of diaphragm disc 76, the shutter blade prevents light from lens 22 from falling on the index 52. However, when diaphragm disc 76 is placed in a position so that aperture 80 cooperates with optical axis 24, follower roller 96 rides into cam notch 100 and spring 102 urges the blade of shutter 90 upwardly so that it clears aperture 82. Thus the index readings on index 52 are visible at the edge of viewfinder aperture only when the diaphragm disc 76 is set for automatic operation.

While we have described throughout the specification cell 34 as being photoelectric, it is contemplated that either photo-voltaic or photo-conductive cells (and associated batteries) can be used.

We claim:

1. In a photographic camera having an optical train for imaging a scene upon a sensitized surface and including an adjustable diaphragm in said train, a lens turret having a number of lenses adapted to be selectively positioned in said optical train, a photoelectric cell, electric motor means coupled to said photoelectric cell and having a movable armature connected to said diaphragm for adjusting the aperture in said diaphragm in accordance with increase or decrease of light falling on said cell, and a viewfinder, means for indicating in said viewfinder the adjustment of said diaphragm including a movable translucent index plate carried by said motor means and bearing indicia, characteristic of various openings of said diaphragm, said index plate being so arranged that said indicia are selectively positioned behind one of the lenses in said turret which is not positioned in said optical train whereby light falling on said last mentioned one of said lenses illuminates said index plate and a second optical train for imaging said selected one of said indicia in said viewfinder adjacent the field of view of said scene.

2. In a photographic camera having an optical train for imaging a scene upon a sensitized surface and including an adjustable diaphragm in said train, a lens turret having a number of lenses adapted to be selectively positioned in said optical train, a photoelectric cell, electric motor means coupled to said photoelectric cell and having a movable armature connected to said diaphragm for adjusting the aperture in said diaphragm in accordance with increase or decrease of light falling on said cell, and a viewfinder, means for indicating in said viewfinder the adjustment of said diaphragm including a movable translucent index plate carried by said motor means and bearing indicia, characteristic of various openings of said diaphragm, said index plate being so arranged that said indicia are selectively positioned behind one of the lenses in said turret which is not positioned in said optical train whereby light falling on said last mentioned one of said lenses illuminates said index plate and a second optical train for imaging said selected one of said indicia in said viewfinder adjacent the field of view of said scene, said index plate having distinctive indicia at each end thereof to warn the user of insufficient or excessive light in said scene.

3. In a photographic camera having an optical train for imaging a scene upon a sensitized surface and including an adjustable diaphragm in said train, a lens turret having a number of lenses adapted to be selectively positioned in said optical train, a photoelectric cell, electric motor means coupled to said photoelectric cell and having a movable armature connected to said diaphragm for adjusting the aperture in said diaphragm in accordance with increase or decrease of light falling on said cell, and a viewfinder, means for indicating in said viewfinder the adjustment of said diaphragm including a movable translucent index plate carried by said motor means and bearing indicia, characteristic of various openings of said diaphragm, said index plate being so arranged that said indicia are selectively positioned behind one of the lenses in said turret which is not positioned in said train whereby light falling on said last mentioned one of said lenses illuminates said index plate and a second optical train for imaging said selected one of said indicia in said viewfinder adjacent the field of view of said scene, a second manually operable diaphragm positioned in said first optical train capable of being adjusted to a number of manually selectable positions and to at least one position wherein said automatic diaphragm is operative, and means responsive to operation of said second diaphragm for blanking said second optical train, said means including an opaque shutter in the path of said second train spring biased in blocking position and cam means operated by said manually operated diaphragm in the latter of said positions.

4. In a photographic camera having an optical train for imaging a scene upon a sensitized surface and including an adjustable diaphragm in said train, a lens turret having a number of lenses adapted to be selectively positioned in said optical train, a photoelectric cell, electric motor means coupled to said photoelectric cell and having a movable armature connected to said diaphragm for adjusting the aperture in said diaphragm in accordance with increase or decrease of light falling on said cell and a viewfinder, means for indicating in said viewfinder the adjustment of said diaphragm including a movable translucent index plate carried by said motor means and bearing indicia, characteristic of various openings of said diaphragm, said index plate being so arranged that said indicia are selectively positioned behind one of the lenses in said turret which is not positioned in said train whereby light falling on said last mentioned one of said lenses illuminates said index plate and a second optical train for imaging said selected one of said indicia in said viewfinder adjacent the field of view of said scene, a second manually operable diaphragm positioned in said first optical train capable of being adjusted to a number of manually selectable positions and to at least one position wherein said automatic diaphragm is operative, said electric motor means being disconnected when said manually operable diaphragm is in positions other than said one position.

5. In a photographic camera having an optical train for imaging a scene upon a sensitized surface and including an adjustable diaphragm in said train, a lens turret having a number of lens adapted to be selectively positioned in said optical train, a photoelectric cell, electric motor means coupled to said photoelectric cell and having a movable armature connected to said diaphragm for adjusting the aperture in said diaphragm in accordance with increase or decrease of light falling on said cell and a viewfinder, means for indicating in said viewfinder the adjustment of said diaphragm including a movable translucent index plate carried by said motor means and bearing indicia, characteristic of various openings of said diaphragm, said index plate being so arranged that said indicia are selectively positioned behind one of the lenses in said turret which is not positioned in said train whereby light falling on said last mentioned one of said lenses illuminates said index plate and a second optical train for imaging said selected one of said indicia in said viewfinder adjacent the field of view of said scene, a diaphragm disc having a number of apertures adapted to be selectively positioned in the first said optical train, one of said apertures being larger than any attainable by said diaphragm and others representing predetermined stop values, said motor means being effective to operate said diaphragm only when said disc is positioned so said one of said apertures is positioned in said first train.

6. In a photographic camera having an optical train for imaging a scene upon a sensitized surface and including an adjustable diaphragm in said train, a lens turret having a number of lenses adapted to be selectively positioned in said optical train, a photoelectric cell, electric motor means coupled to said photoelectric cell and having a movable armature connected to said diaphragm for adjusting the aperture in said diaphragm in accordance with increase or decrease of light falling on said cell and a viewfinder, means for indicating in said viewfinder the adjustment of said diaphragm including a movable translucent index plate carried by said motor means and bearing indicia, characteristic of various openings of said diaphragm, said index plate being so arranged that said indicia are selectively positioned behind one of the lenses in said turret which is not positioned in said train whereby light falling on said last mentioned one of said lenses illuminates said index plate and a second optical train for imaging said selected one of said indicia in said viewfinder adjacent the field of view of said scene, a diaphragm disc having a number of apertures adapted to be selectively positioned in the first said optical train, one of said apertures being larger than any attainable by said diaphragm and others representing predetermined stop values, said motor means being effective to operate said diaphragm only when said disc is positioned so said one of said apertures is positioned in said first train, and means for occulting said second train when the others of said number of apertures are interposed in said first train.

References Cited in the file of this patent

UNITED STATES PATENTS

| | | |
|---|---|---|
| 2,013,362 | Riszdorfer | Sept. 3, 1935 |
| 2,163,737 | Prinsen | June 27, 1939 |
| 2,236,069 | Robinton | Mar. 25, 1941 |
| 2,865,274 | Richartz | Dec. 23, 1958 |
| 2,925,760 | Broschke | Feb. 23, 1960 |
| 2,933,991 | Sauer | Apr. 26, 1960 |